US 7,783,988 B2

(12) United States Patent
Curran

(10) Patent No.: US 7,783,988 B2
(45) Date of Patent: Aug. 24, 2010

(54) METHOD AND APPARATUS FOR SCHEDULING APPOINTMENTS FOR SINGLE LOCATION ENTRIES

(75) Inventor: Kevin M. Curran, Morris Plains, NJ (US)

(73) Assignee: SAP AG, Walldorf (DE)

(*) Notice: Subject to any disclaimer, the term of this patent is extended or adjusted under 35 U.S.C. 154(b) by 1232 days.

(21) Appl. No.: 11/351,063

(22) Filed: Feb. 9, 2006

(65) Prior Publication Data

US 2007/0186193 A1 Aug. 9, 2007

(51) Int. Cl.
*G06F 3/048* (2006.01)
(52) U.S. Cl. .................. 715/780; 764/963; 764/768
(58) Field of Classification Search .............. 715/764, 715/780, 963, 968
See application file for complete search history.

(56) References Cited

U.S. PATENT DOCUMENTS

| 5,845,257 | A | * | 12/1998 | Fu et al. ..................... 705/8 |
| 5,895,451 | A | * | 4/1999 | Yamade et al. ............... 705/8 |
| 6,016,478 | A | * | 1/2000 | Zhang et al. ................. 705/9 |
| 6,198,696 | B1 | * | 3/2001 | Korpi et al. ................ 368/21 |
| 6,233,204 | B1 | * | 5/2001 | Chu et al. .................. 368/21 |
| 6,275,449 | B1 | * | 8/2001 | Wang ........................ 368/21 |
| 6,868,427 | B2 | * | 3/2005 | Herzog et al. ............ 707/104.1 |
| 7,082,402 | B2 | | 7/2006 | Conmy et al. |
| 7,219,109 | B1 | * | 5/2007 | Lapuyade et al. .......... 707/200 |
| 7,373,312 | B1 | * | 5/2008 | Poon ........................ 705/26 |
| 2003/0204474 | A1 | | 10/2003 | Capek et al. |
| 2005/0033615 | A1 | * | 2/2005 | Nguyen et al. ............... 705/5 |
| 2005/0114191 | A1 | | 5/2005 | Atkin et al. |
| 2005/0187001 | A1 | * | 8/2005 | Fishel ....................... 463/9 |
| 2006/0129626 | A1 | | 6/2006 | Fitzpatrick et al. |

FOREIGN PATENT DOCUMENTS

JP 2000292571 A * 10/2000
JP 2004258971 A * 9/2004

OTHER PUBLICATIONS

"Sams teach yourself Microsoft Outlook 2000 in 10 minutes", by Joseph Habraken, published 1999, pp. c, i, ii, 140, 141, 192.*
Using Microsoft Outlook 98', by Padwick et al., published by Que in 1998, pp. 436-438.*
Microsoft Corporation, "Microsoft Outlook 2003," version 11.8118.8132 with service pack 2.
U.S. Appl. No. 11/351,067, filed Feb. 9, 2006.

* cited by examiner

*Primary Examiner*—William L Bashore
*Assistant Examiner*—Gregory A Distefano
(74) *Attorney, Agent, or Firm*—Cooper & Dunham LLP

(57) ABSTRACT

A method for scheduling an appointment using a scheduling software system, includes receiving appointment information entered into appointment scheduling fields of the scheduling software system, the appointment scheduling fields including a location field and a time zone field, updating a user's calendar entries based on the appointment information, causing a search engine to look up a suggested time zone associated with the appointment information entered into the location field and comparing the appointment information entered into the time zone field with the suggested time zone.

27 Claims, 9 Drawing Sheets

METHOD AND APPARATUS FOR SCHEDULING APPOINTMENTS FOR SINGLE LOCATION ENTRIES

BACKGROUND

1. Technical Field

The present disclosure relates generally to scheduling appointments and, more particularly, to a method and apparatus for scheduling appointments for single location entries.

2. Description of the Background Art

There are various software systems that allow users to schedule events, manage and organize information and communicate with each other. One system is Microsoft's Outlook which is a personal information management and communications program. One feature of Outlook allows users to arrange appointments and meetings by inputting information such as the names of the participant(s) invited, the start/end time of the meeting, etc. The user arranging the appointment (e.g., meeting, conference call, etc.) is generally referred to herein as the creator.

When creating an appointment or a meeting request in Outlook, the time zone for which the creator's computer is set is used as the default time zone in which the Outlook entry will be scheduled. However, not all participants may be in the same time zone. In extreme cases, each participant may be in a separate time zone, and even the creator may be, at the scheduled time, in a time zone different from that in which the creator's computer was set when the Outlook entry was created. This disparity can cause many problems for the creator of the appointment or meeting, who must keep these time zones changes in mind when selecting the best time. For example, a participant's calendar, when accessed via the Outlook Exchange Server, may appear to the creator as open at a scheduled time. However, that may be due to the fact that the scheduled time may be outside business hours in the time zone in which the participant normally is located, making the scheduled time inappropriate for a business meeting. Likewise, the creator may miscalculate the time change for an upcoming business trip, thereby scheduling meetings at unintended scheduled times.

Present systems do not automatically account for time zone changes, many of which are otherwise unknown to the system. If the system is not aware of time zone differences because it does not track this information, then the system cannot account for the differences. The time zone difference information may only reside in the mind of the user, forcing the user to remember and correctly account for such information, if the user even has such information. Because the present systems do not account for such time zone difference information and the user may not remember or correctly account for it, errors may be made in planning Calendar events. Such errors can result in incorrectly scheduled meeting requests, for example, that may not be accepted by the invitees because of the poor timing, forcing the scheduling person to create an Updated Meeting Request. This may consume more than twice as much of the creator's time as was required for creating the first Meeting Request.

SUMMARY

This application describes tools (in the form of methodologies, apparatuses, and systems) for scheduling appointments. The tools may be embodied in one or more computer programs stored on a computer readable medium or program storage device and/or transmitted in the form of a computer data signal in one or more segments via a computer network or other transmission medium.

A method for scheduling an appointment using a scheduling software system, comprises receiving appointment information entered into appointment scheduling fields of the scheduling software system, the appointment scheduling fields including a location field and a time zone field, updating a user's calendar entries based on the appointment information, causing a search engine to look up a suggested time zone associated with the appointment information entered into the location field and comparing the appointment information entered into the time zone field with the suggested time zone.

A programmed computer system for performing a method for scheduling an appointment using a scheduling software system, said method comprising receiving appointment information entered into appointment scheduling fields of the scheduling software system, the appointment scheduling fields including a location field and a time zone field, updating a user's calendar entries based on the appointment information, causing a search engine to look up a suggested time zone associated with the appointment information entered into the location field and comparing the appointment information entered into the time zone field with the suggested time zone.

A computer recording medium including computer executable code for scheduling an appointment using a scheduling software system, comprises code for receiving appointment information entered into appointment scheduling fields of the scheduling software system, the appointment scheduling fields including a location field and a time zone field, code for updating a user's calendar entries based on the appointment information, code for causing a search engine to look up a suggested time zone associated with the appointment information entered into the location field and code for comparing the appointment information entered into the time zone field with the suggested time zone.

A method for scheduling an appointment using a scheduling software system, comprises receiving appointment information entered into appointment scheduling fields of the scheduling software system, the appointment scheduling fields including a location field and a time zone field, updating a user's calendar entries based on the appointment information and allowing the user to view the appointment in the user's calendar before the user saves the appointment.

A programmed computer system for performing a method for scheduling an appointment using a scheduling software system, the method comprising receiving appointment information entered into appointment scheduling fields of the scheduling software system, the appointment scheduling fields including a location field and a time zone field, updating a user's calendar entries based on the appointment information and allowing the user to view the appointment in the user's calendar before the user saves the appointment.

A computer recording medium including computer executable code for scheduling an appointment using a scheduling software system, comprises code for receiving appointment information entered into appointment scheduling fields of the scheduling software system, the appointment scheduling fields including a location field and a time zone field, code for updating a user's calendar entries based on the appointment information and code for allowing the user to view the appointment in the user's calendar before the user saves the appointment.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
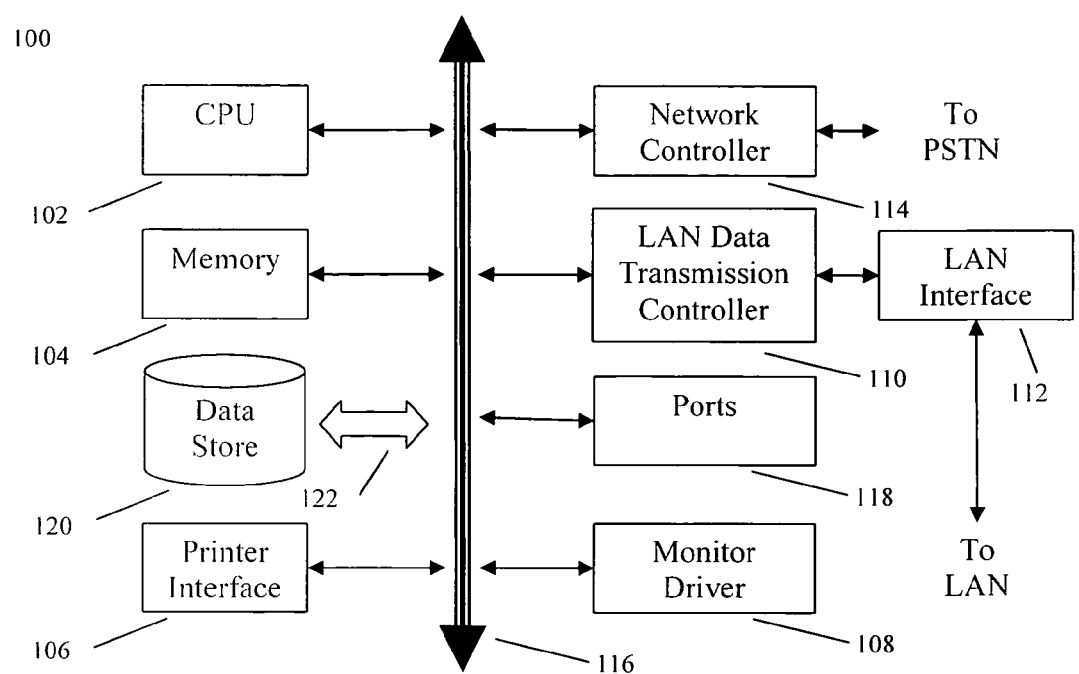
FIG. 1 is a block diagram of a computer system capable of implementing embodiments of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

According to an embodiment of the present disclosure, a time zone information box is associated with an Outlook entry made to schedule an appointment so that the time zone may be specified when the entry is created. Although embodiments of the present disclosure will be described with respect to Outlook, it will be appreciated that aspects of the present disclosure may be applied to other personal information management and communications systems.

Figure 2:
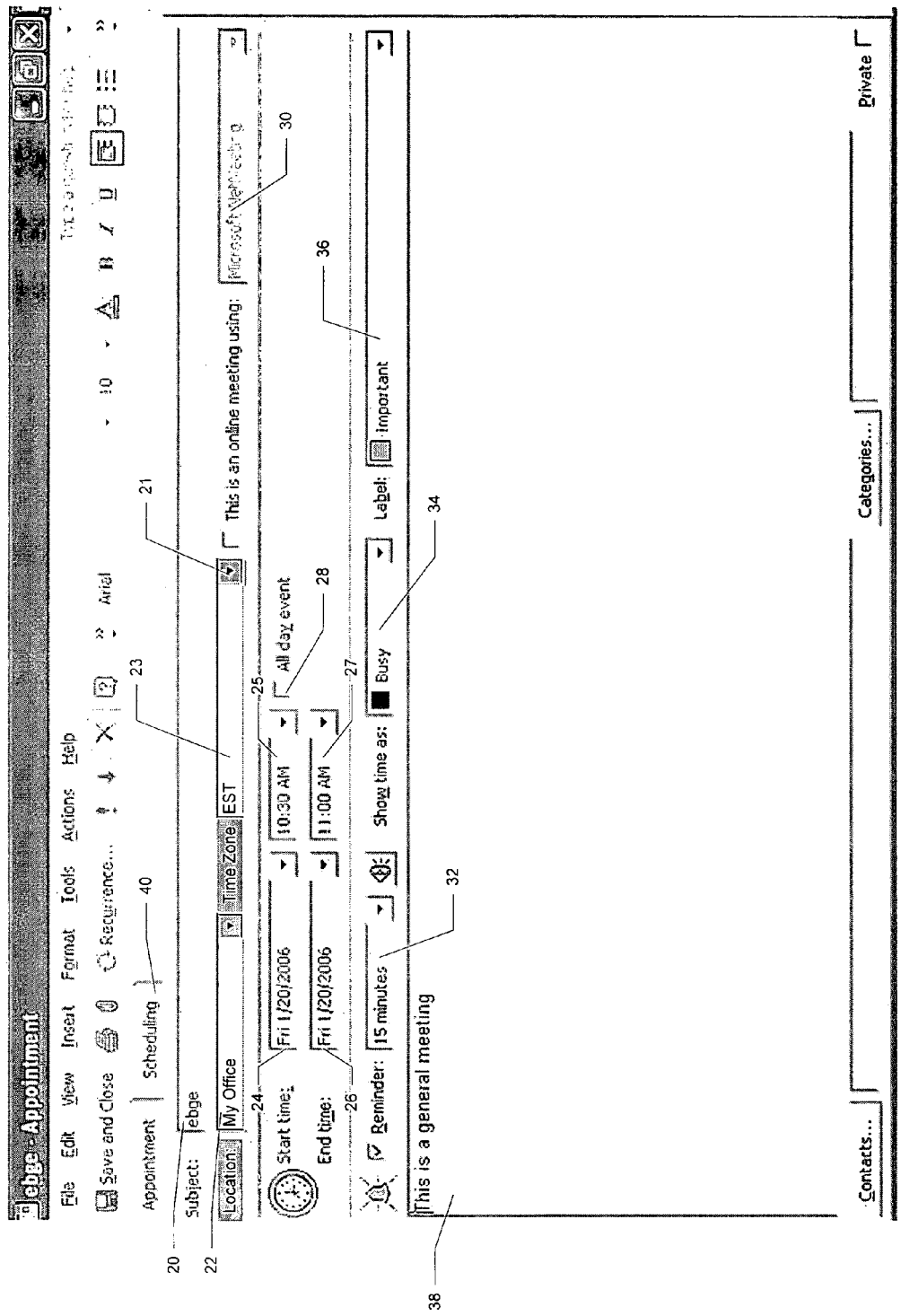
FIG. 2 is a screen shot of an Outlook window used for creating appointments according to an embodiment of the present disclosure.

FIG. 2 is a view of an Outlook window used for scheduling appointments. The creator of the appointment inputs a Subject of the appointment in box 20 and a Location of the appointment in box 22. If the appointment is for an online meeting, the user can specify the type using pull down menu 30. The user can also specify a start date and time in boxes 24, 25 and end date and time in boxes 26 and 27 and can arrange an all day event by checking box 28. The user is also able to arrange reminders using pull down menu 32, indicate how the time will be shown blocked in the participants' calendar (box 34) and can assign a label in box 36. Window 38 allows the creator to provide detailed information about the meeting if desired.

According to an embodiment of the present disclosure, when the creator enters a Location in box 22, the time zone last entered for that location (if any) will be displayed in Time Zone box 23. The creator can then leave the time zone as displayed in box 23 or can select another time zone by either typing in a new one or selecting one using the drop down menu button 21.

Figure 3:
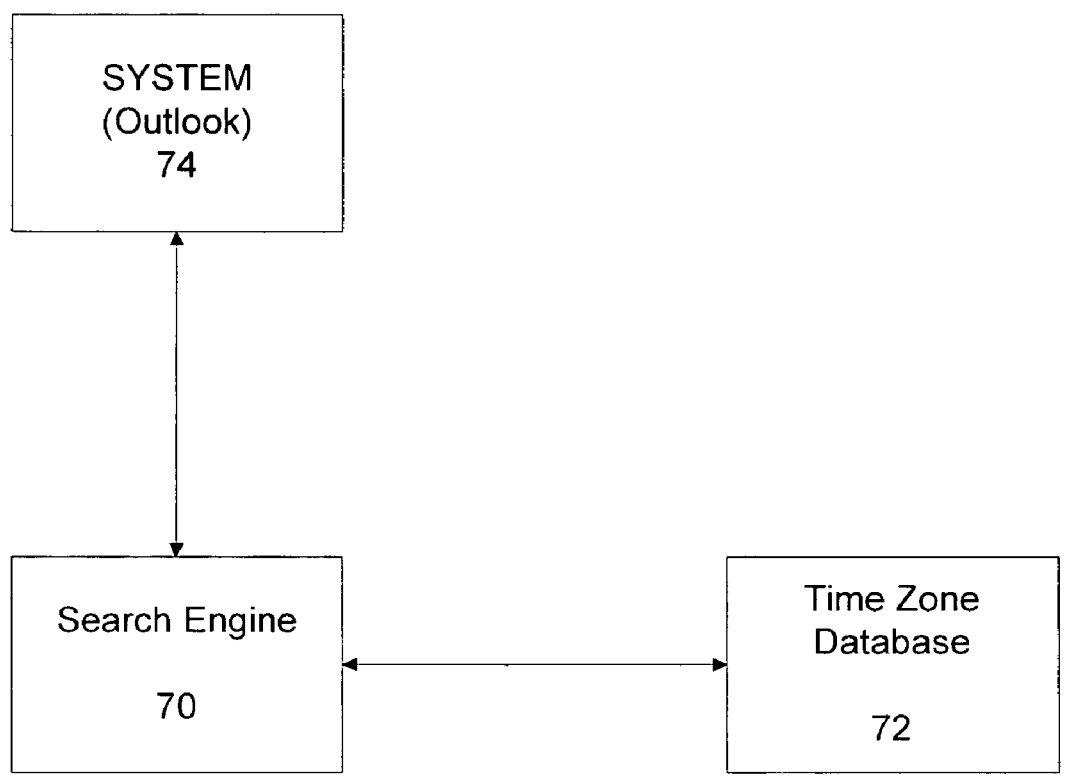
FIG. 3 is a block diagram for describing a search engine according to an embodiment of the present disclosure.
Figure 4:
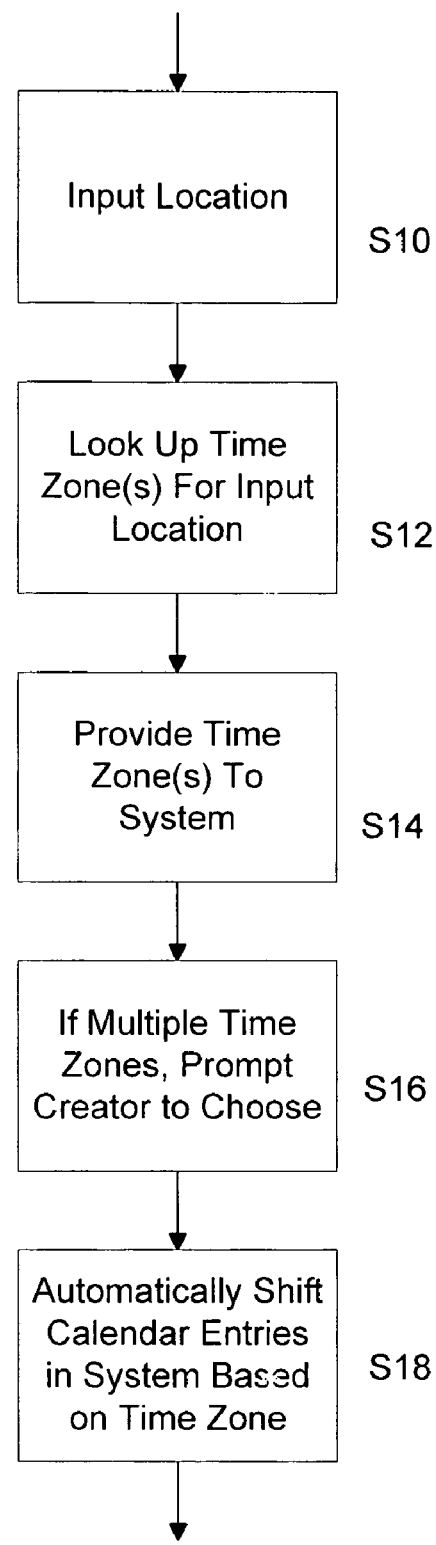
FIG. 4 is a flow chart for describing a search according to an embodiment of the present disclosure.

As shown in FIGS. 3 and 4, according to an embodiment of the present disclosure, in response to the creator entering a Location in Outlook 74 (Step S10), a search engine 70 searches a reference database 72 for a time zone(s) associated with the Location (Step S12). The time zone(s) are returned to Outlook 74 and displayed in box 23 (FIG. 2) (Step S14). Database 72 may be provided on the same computer system as Outlook or can be remotely accessible therefrom. The creator then has an option of confirming the time zone displayed in box 23 by leaving the time zone in box 23 or changing the determined time zone by modifying the time zone in box 23 (Step S16). If, for example, "My Office" is located in Eastern Standard Time (EST) time zone, the first time the location "My Office" is used as an appointment location, box 23 will be blank and the creator can select the correct time zone (EST) using drop down menu 21. Then, whenever the location "My Office" or another name corresponding to "My Office" is selected in the future, EST will automatically be selected and displayed in box 23. According to another embodiment, when "My Office" is entered as the appointment location, the system will automatically assign it the time zone presently assigned on the computer being used. The user can then change the time zone as desired.

According to yet another embodiment of the present disclosure, the time zone for "My Office" may be determined by referencing the creator's profile in the Outlook address book. If the office address data are populated for the creator, the location of the office may act as a default time zone for appointments at the creator's office (e.g., "My Office"). While an appointment may be created without specifying the location (which may be To-be-determined ("TBD")), at least a default time zone should be referenced. If no appointment information is entered that specifies the location of the appointment, a default time zone may be the time zone for which the computer is configured at the time the appointment is created. However, according to various embodiments of the present disclosure, the user may also configure the default time zone to correspond, for instance, to the user's office location, the user's computer's current time zone, or any other preferred time zone.

The inclusion of information in the Location field 22 of the Outlook entry such as names of cities, states, or countries may result in additional hits in the search for the appropriate time zone. For example, in response to the location "Paris" being entered into Location box 22, search engine 70 might retrieve several possible time zones including, for example, Central European Time for Paris, France, and Central [US] Time for Paris, Tex. Each choice would be shown in the pull down menu window 23, allowing the creator to select the correct time zone. These time zone entries may be stored in a time zone look-up table, which may include both independently available atlas data as well as personally configurable data, such as location favorites. Searching the time zone look-up table may yield a suggested time zone for scheduling the appointment. According to an embodiment of the present disclosure, more frequently and/or more recently used locations appear higher on the list of possible time zone selections in pull down menu window 23. The calendar entries for that appointment are then shifted in the system based on the selected time zone (Step S18). If the appointment information received in the time zone field differs from the suggested time zone, the user may be prompted to select the correct time zone, such as selecting between the user-entered time zone and the suggested time zone. If the user does not enter location data or time zone data, the user may be prompted to select use of a default time zone as the suggested time zone.

According to an embodiment of the present disclosure, when a creator creates a personal Appointment (e.g., no one is invited, and hence no other individual's calendars are involved), this single modification of Outlook would determine the time zone change for the creator so that the creator selects the desired scheduled time, as compared with the creator's selected time zone setting at the time of the creation of the Appointment. Thus, when the creator views Calendar availability, the times would automatically be shifted accordingly for any shown Outlook Calendar entries.

Figure 5:
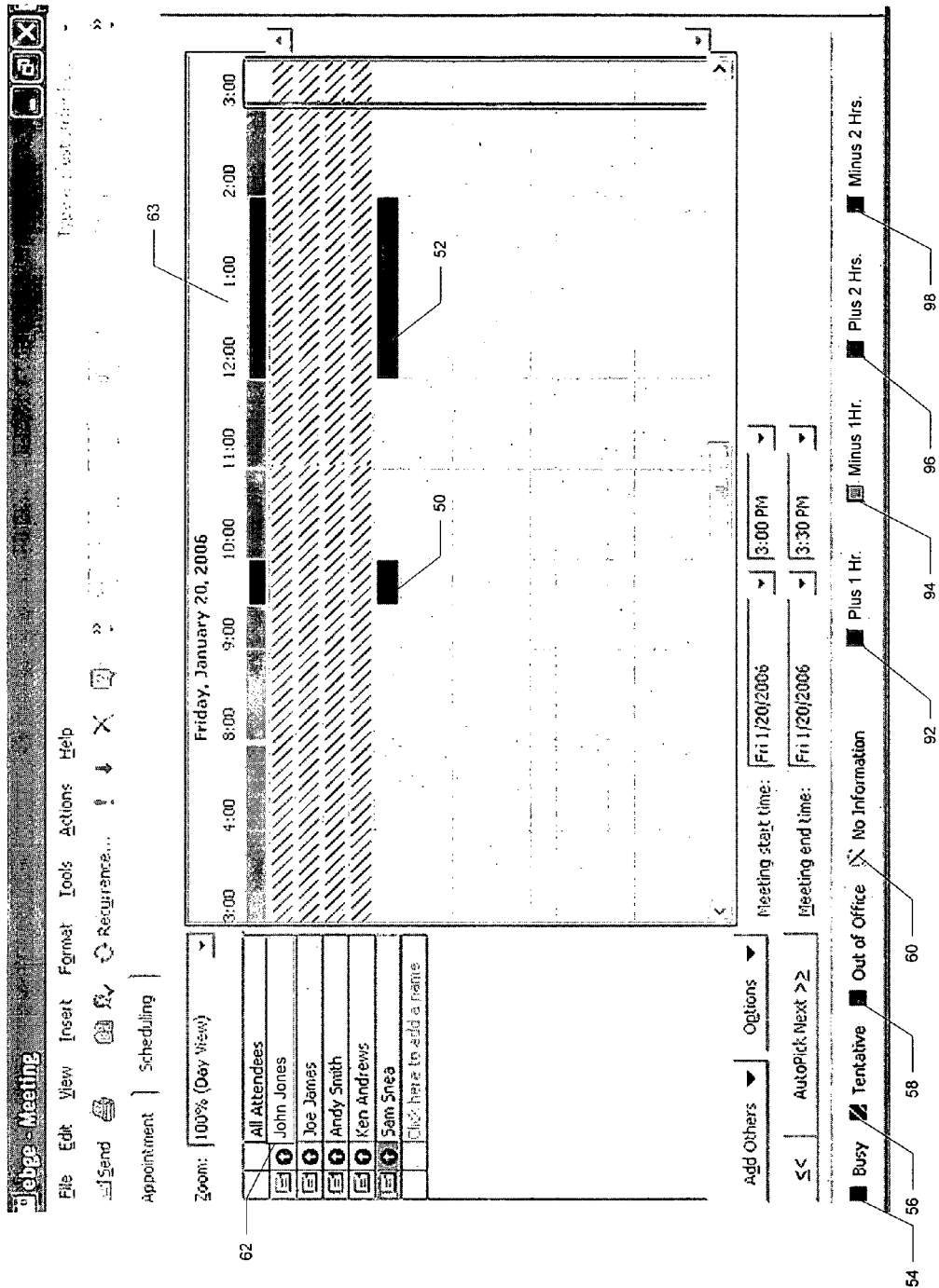
FIG. 5 is a screen shot of an Outlook window used for viewing a schedule according to an embodiment of the present disclosure.

After inputting the appointment information and clicking on Scheduling tab 40 (FIG. 2), the user is presented with a window as shown in FIG. 5, thereby allowing the user to view the appointment in the user's calendar before the user saves the appointment. The scheduling window shows attendees 62 of the meeting as well as a calendar 63. Outlook uses a coloring pattern to clearly indicate at a glance the status of time in a user's scheduling calendar. As shown in the bottom left hand side of the window, there are four states that can be shown. Although shown in black and white, it will be appreciated that in actuality, the color codes are as follows. White stripes 60 indicate that no information is available for that user for that time. Blue 54 indicates that the corresponding user is busy (booked) for that time. Blue stripes 56 indicate that the corresponding user is tentatively booked, and maroon 58 indicates that the corresponding user is out of office for that time. For example, as shown, colored bar 50 indicates that participant "Sam Snea" is busy from 9:30-10:00 and colored bar 52 indicates that Sam is Out of Office from 12:00-2:00.

According to an embodiment of the present disclosure, in place of or in addition to the standard four-color coloring pattern described above, additional colors may be used to indicate time zone differences between the location where the creator entered the appointment into Outlook and the location where the appointment is to actually take place. For example, according to an embodiment of the present disclosure, green 92 represents plus one hour, yellow 94 represent minus one hour, red 96 represents plus two hours, pink 98 represent minus two hours, etc. The bars (50, 52) may be arranged so that the top half of the bar displays the color code corresponding to the status of time in a user's scheduling calendar and the bottom half of the bar is color coded to indicate the time zone difference.

Because the creator's Calendar availability shifts to the correct times of day for the appropriate time zone of a particular Outlook Calendar entry, the creator can accurately compare the creator's availability for an in-person meeting with the availabilities of invitees to the in-person meeting when creating an in-person meeting request. Hence, the in-person meeting request would be scheduled for the desired time of day of the time zone for the entered Location, and all participants' availabilities would be comparable since each person would be in the same time zone in order to attend the in-person meeting.

Figure 6:
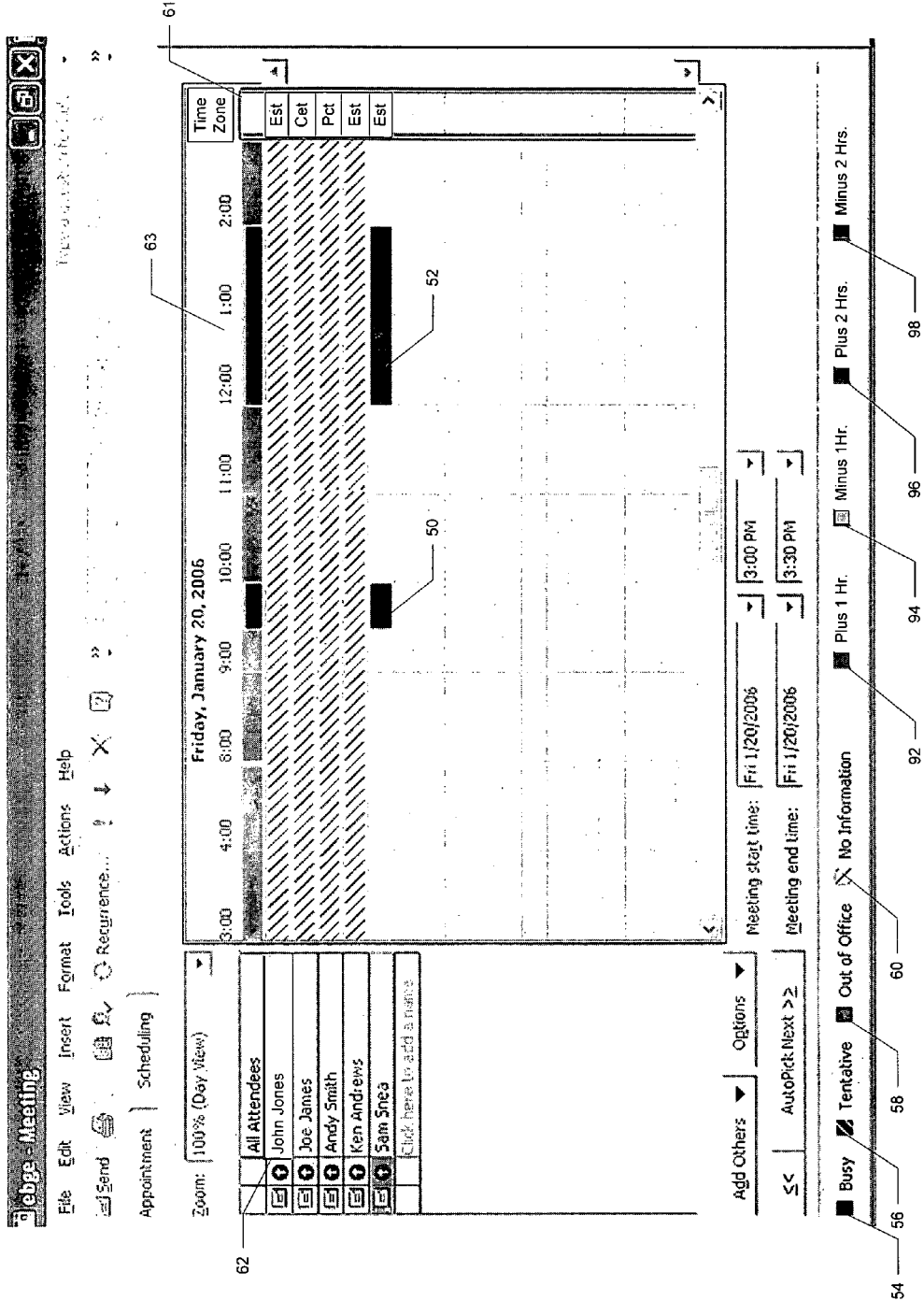
FIG. 6 is a screen shot of an Outlook window used for viewing a schedule according to another embodiment of the present disclosure.

According to another embodiment of the present disclosure, the creator may create a Meeting Request, whereby one or more invitees are invited to attend. The present time zone setting of each invitee is sent by the exchange server providing each invitee's availability information to the creator and displayed in a Time Zone column 61 as shown in FIG. 6. This allows the creator to compare differences in time zones among the intended invitees of a single location meeting, in the Scheduling View. While the present differences in time zones should disappear when all attendees are at the meeting location, this information may foreshadow difficulties with invitees' abilities to travel to the meeting location and/or their ability and/or willingness to participate remotely via teleconference at a particular time.

Embodiments of the present disclosure are useful for multiple location calendar entries as well as single location calendar entries described above. According to various embodiments of the present disclosure three time zones may be specified including a default time zone, a selected time zone and one or more future time zones. According to an embodiment of the present disclosure, the present system correlates the user's current address information (e.g., the user's present location) with the appropriate time zone. This is referred to herein as the user's default time zone. The current time zone setting for the user's computer is referred to as the selected time zone. The selected time zone is used by Outlook to identify the times when emails arrive, and other events occur. The user can create future time zone settings based on planned trips. Future time zone settings are similar to the "All-day Event" entry used in Outlook. The future time zone settings might be entered for vacation days, for example, so that when the trip occurs, a reminder can be provided to the user to adopt a new time zone setting as his default time zone setting. In the alternative, the new time zone setting can be automatically applied by the system if the user desires, when the reminder is viewed. Thus, each user would have a default time zone setting, a current time zone setting, and potentially multiple future time zone settings. It will be appreciated that depending on circumstances, the three time zone settings may correlate to the same time zone or multiple different time zones.

Figure 7:
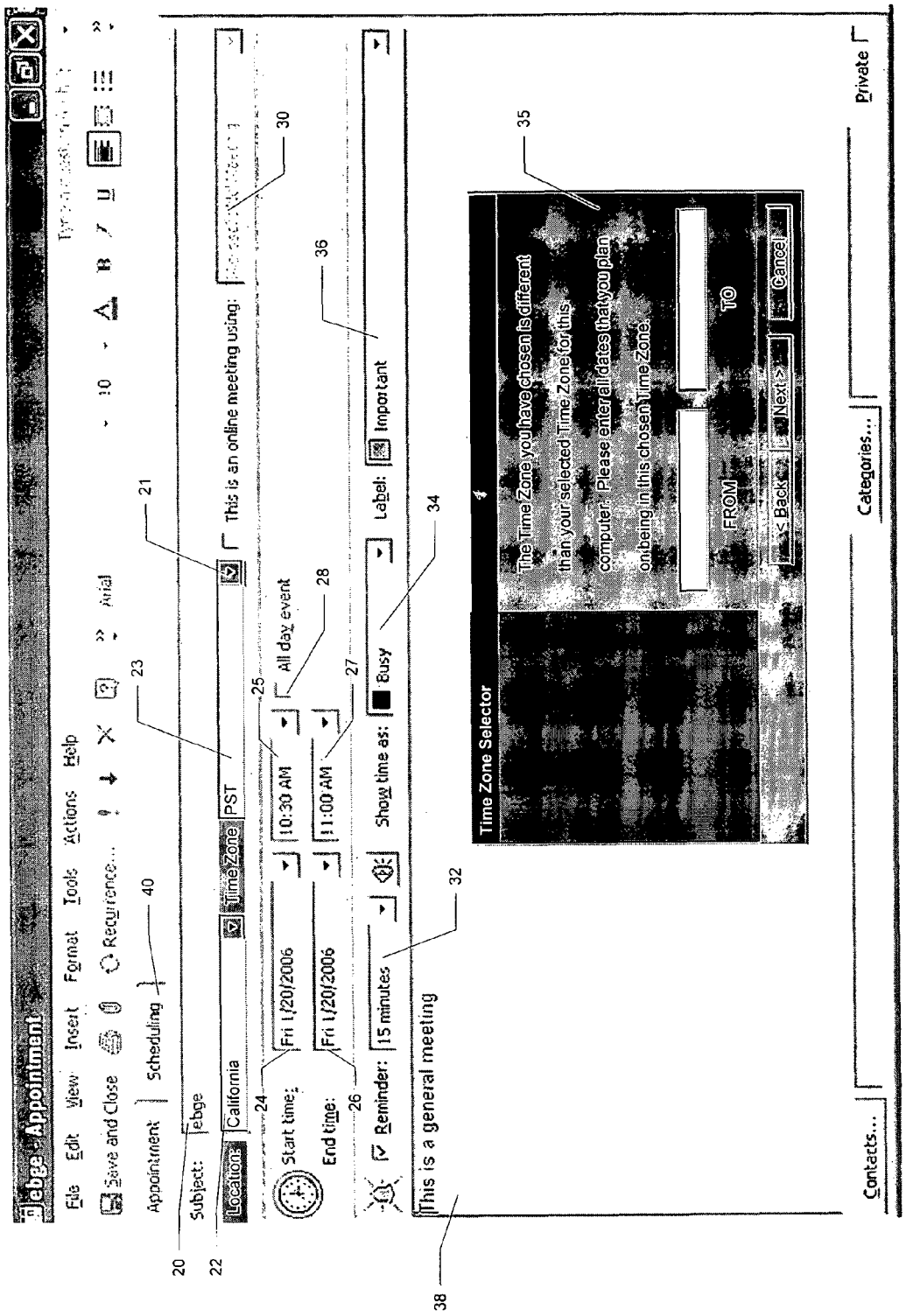
FIG. 7 is a screen shot of an Outlook window used for scheduling appointments according to an embodiment of the present disclosure.

According to an embodiment of the present disclosure, when creating an Outlook Calendar entry, if the creator selects a time zone different from the time zone setting presently set, Outlook prompts the creator to indicate in the creator's Calendar the dates during which the creator will be in a different time zone. For example, as shown in FIG. 7, if the creator's selected time zone is EST and the creator enters an appointment in California (a time zone of PST), a window 35 will pop up prompting the creator to select the dates during which he will be in that time zone. After the creator enters the From and To dates, the present system automatically populates the creator's calendar with the information.

Because such personal time zone information may then be stored in a creator's Calendar, this personal time zone information may be used when the creator creates a Meeting Request with other users in the creator's Outlook Exchange Server network, whose Calendar information is also available to the creator. Combined with the three types (default time zone, current time zone setting, and future time zone settings) of time zone information of other users, the creator of a Meeting Request for a teleconference is able to import not only the availability information (free, booked, tentatively booked, or absent) of the invitees, but also the corresponding time zone information. For example, a participant based in Germany may be scheduled to be in California during a teleconference created by a colleague in France (creator). If the creator is unaware of this, the creator may schedule a time for the teleconference that may be very inconvenient to the participant scheduled to be in California. This would likely result in the participant suggesting an alternative Meeting Request time, instead of a simple acceptance of the Meeting Request. However, according to en embodiment of the present disclosure, since the creator will see that the participant is scheduled to be in California during the teleconference when scheduling the teleconference, the creator can take this into consideration when selecting a convenient time.

Figure 8:
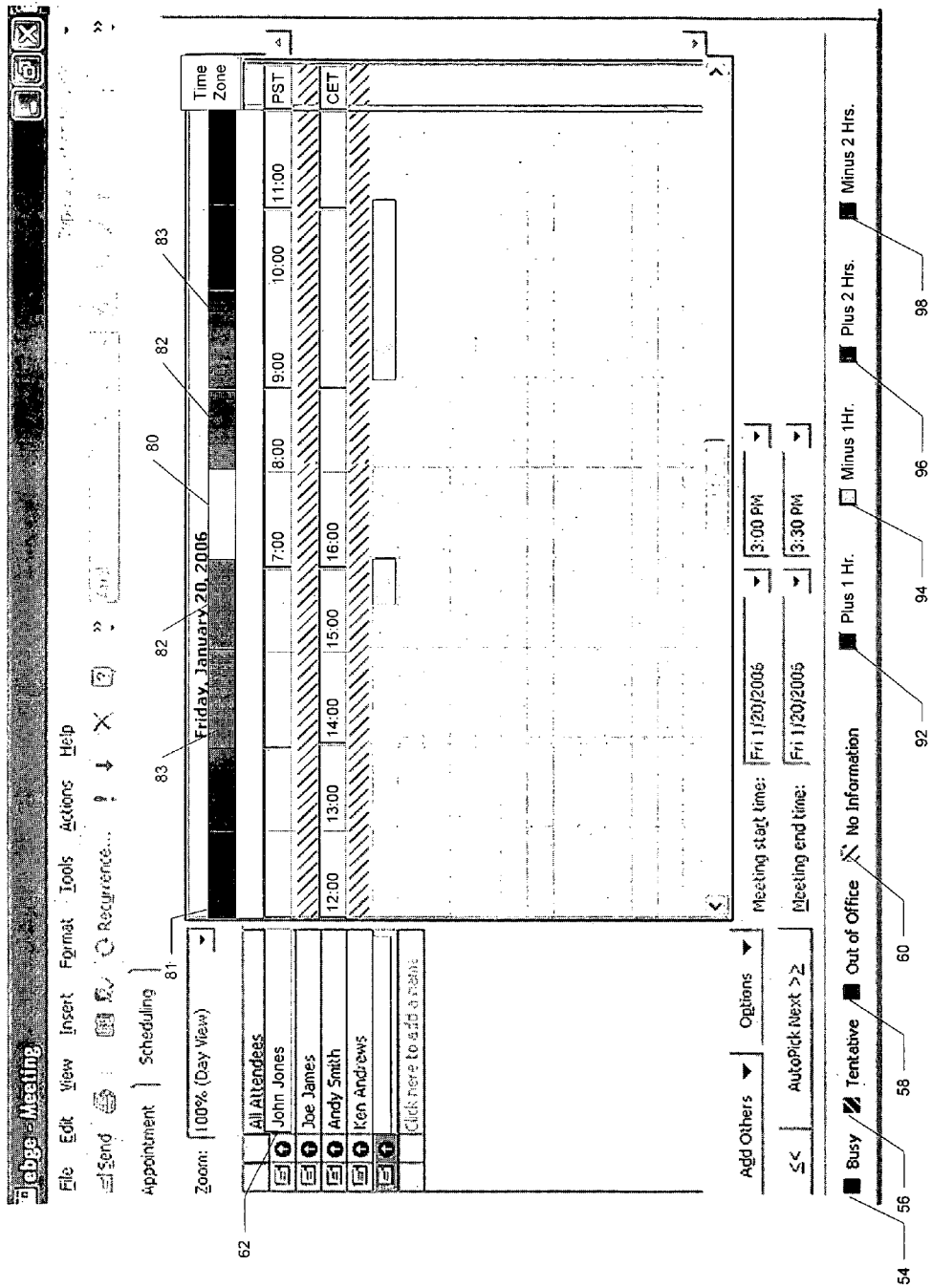
FIG. 8 is a screen shot of an Outlook window used for viewing a schedule according to another embodiment of the present disclosure.

As described above, colors may be used to indicate time zone differences (e.g., green for plus one hour, green stripes for minus one hour, yellow for plus two hours, yellow stripes for minus two hours, etc.). In addition, according to another embodiment of the present disclosure, colors and or shading may be used to indicate convenience of overlapping schedules' selected business hours. For example, as shown in FIG. 8, if a Germany-based colleague (Andy Smith) has selected office hours of 8:00-17:00 CET, and a California-based colleague (John Jones) has selected office hours of 7:00-17:00 PST, then because of the 9-hour time zone difference, the one-hour overlap of 16:00-17:00 CET/07:00-08:00 PST would be shaded light green 80 (in this example, light gray) in Time Zone Convenience indicator bar 81. Each overlapping hour before and after that would be shaded different colors and/or shades 82 (e.g., light orange), and progressively farther apart overlapping hours would be shaded progressively darker colors and/or shades 83 (e.g., red). Hence, light green shading 80 would represent convenient times, light orange shading 82 would represent slightly inconvenient times, and other times would be shaded a darker shade of red as the time becomes progressively more inconvenient The combination of multiple invitees' time zone and availability information could thus assist in the quicker selection of a time that is at best, hopefully convenient to all, or at least, the least inconvenient to most.

Figure 9:
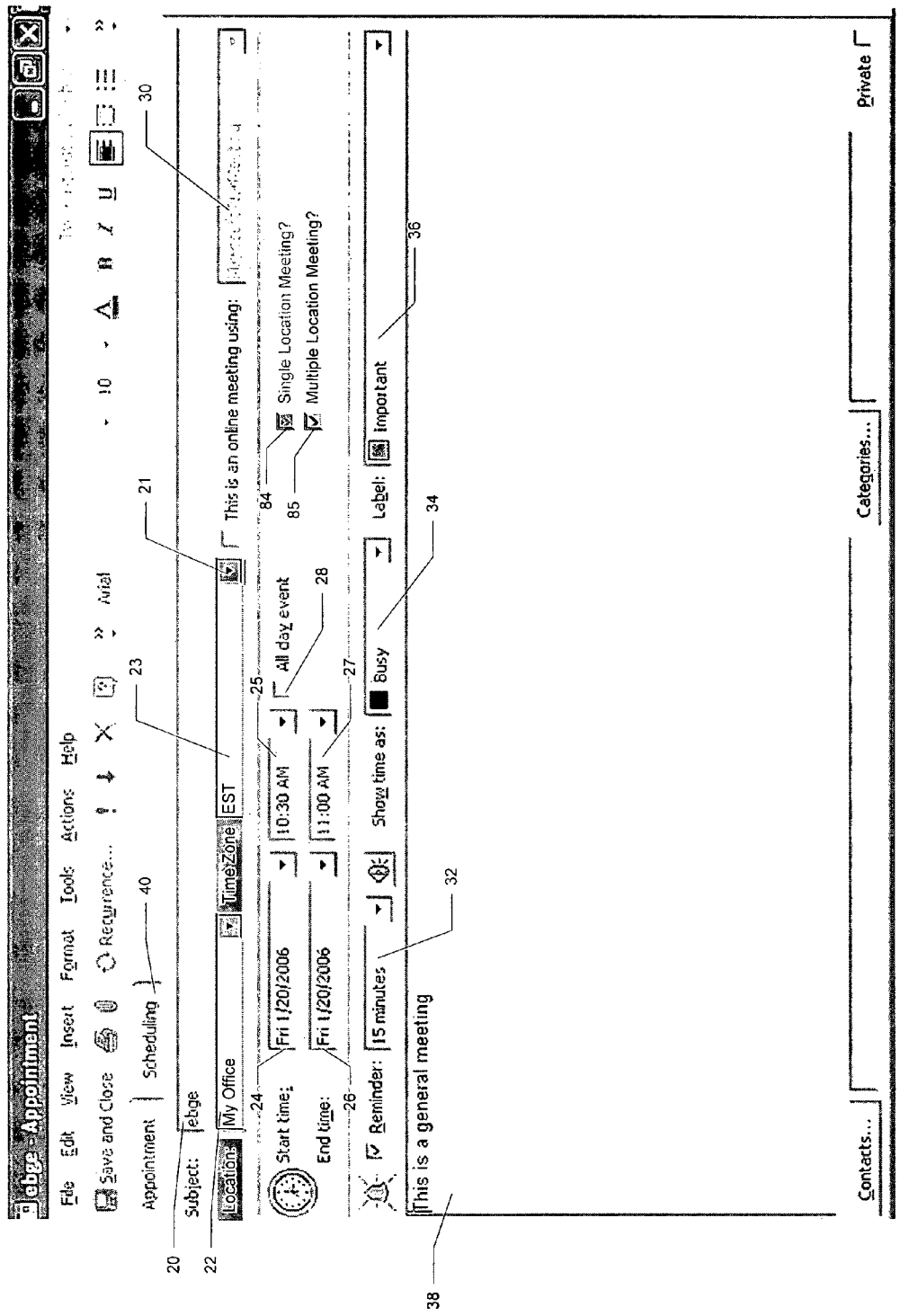
FIG. 9 is a screen shot of an Outlook window used for scheduling appointments according to a further embodiment of the present disclosure.

According to an embodiment of the present disclosure as shown in FIG. 9, the user can select whether the meeting request is for a single location meeting (e.g., where all invitees are in the same room) or a multiple location meeting such as a teleconference, video conference, webex, etc. (e.g., where some or all invitees are in different locations.) By selecting either single location meeting button 84 or multiple location meeting button 85, the present system can help the user navigate the appropriate time zones. For example, selecting single location meeting button 84 will then prompt the user with the screens shown in FIGS. 2, 5, 6 and/or 7. Selecting multiple location meeting button 85 will prompt the user with a screen such as that shown in FIG. 8. In this way, the present system can prompt the user to provide an appropriate amount and type of time zone information that is relevant to the type of appointment being scheduled.

The present system can be implemented in digital electronic circuitry, or in computer hardware, firmware, software, or in combinations of them. The present system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the present system can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry. To provide for interaction with a user, the present system can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for scheduling an appointment using a scheduling software system, comprising:
   receiving appointment information entered into appointment scheduling fields of the scheduling software system, the appointment scheduling fields including a location field and a time zone field;
   updating a user's calendar entries based on the appointment information;
   causing a search engine to look up a suggested time zone associated with the appointment information entered into the location field and providing a list of suggested possible time zones associated with the appointment information;
   comparing the appointment information entered into the time zone field with the suggested time zone; and
   prompting a user to select a correct time zone from the list of suggested possible time zones if the appointment information received for the time zone field differs from the suggested time zone.

2. The method of claim 1, further comprising: pre-populating the time zone field with the suggested time zone if no appointment information is received for the time zone field.

3. The method of claim 1, wherein the suggested time zone is a default time zone associated with the user if the location field is blank.

4. The method of claim 3, wherein the default time zone is configurable by the user.

5. The method of claim 1, wherein the location field comprises appointment information identifying at least one of a city, state, country and place describing the location.

6. The method of claim 1, further comprising: associating a new location field entry with a time zone field entry; and
   tracking the location field entry and its associated time zone field entry in a time-zone look-up database.

7. The method of claim 1, wherein the calendar entries are displayed color coded to indicate time zone differences.

8. The method of claim 7, wherein a time zone difference represents a difference between the time zone setting on the user's computer when the appointment was input to the system and the time zone of the appointment location.

9. The method of claim 1, wherein the appointment scheduling fields allow the user to distinguish between a single location appointment and a multiple location appointment.

10. A programmed computer system for performing a method for scheduling an appointment using a scheduling software system, said method comprising:
    receiving appointment information entered into appointment scheduling fields of the scheduling software system, the appointment scheduling fields including a location field and a time zone field;
    updating a user's calendar entries based on the appointment information;
    causing a search engine to look up a suggested time zone associated with the appointment information entered into the location field and providing a list of suggested possible time zones associated with the appointment information;
    comparing the appointment information entered into the time zone field with the suggested time zone; and
    prompting a user to select a correct time zone from the list of suggested possible time zones if the appointment information received for the time zone field differs from the suggested time zone.

11. The programmed computer system of claim 10, further comprising:
    pre-populating the time zone field with the suggested time zone if no appointment information is received for the time zone field.

12. The programmed computer system of claim 10, wherein the suggested time zone is a default time zone associated with the user if the location field is blank.

13. The programmed computer system of claim 12, wherein the default time zone is configurable by the user.

14. The programmed computer system of claim 10, wherein the location field comprises appointment information identifying at least one of a city, state, country and place describing the location.

15. The programmed computer system of claim 10, further comprising:
    associating a new location field entry with a time zone field entry; and
    tracking the location field entry and its associated time zone field entry in a time-zone look-up database.

16. The programmed computer system of claim 10, wherein the calendar entries are displayed color coded to indicate time zone differences.

17. The programmed computer system of claim 16, wherein a time zone difference represents a difference between the time zone setting on the user's computer when the appointment was input to the system and the time zone of the appointment location.

18. The programmed computer system of claim 10, wherein the appointment scheduling fields allow the user to distinguish between a single location appointment and a multiple location appointment.

19. A computer recording medium including computer executable code for scheduling an appointment using a scheduling software system, comprising:
    code for receiving appointment information entered into appointment scheduling fields of the scheduling software system, the appointment scheduling fields including a location field and a time zone field;
    code for updating a user's calendar entries based on the appointment information;
    code for causing a search engine to look up a suggested time zone associated with the appointment information entered into the location field and providing a list of suggested possible time zones associated with the appointment information;

code for comparing the appointment information entered into the time zone field with the suggested time zone; and code for prompting a user to select a correct time zone from the list of suggested possible time zones if the appointment information received for the time zone field differs from the suggested time zone.

20. The computer recording medium of claim 19, further comprising: code for pre-populating the time zone field with the suggested time zone if no appointment information is received for the time zone field.

21. The computer recording medium of claim 20, further comprising:

code for associating a new location field entry with a time zone field entry; and code for tracking the location field entry and its associated time zone field entry in a time-zone look-up database.

22. The computer recording medium of claim 19, wherein the suggested time zone is a default time zone associated with the user if the location field is blank.

23. The computer recording medium of claim 22, wherein the default time zone is configurable by the user.

24. The computer recording medium of claim 19, wherein the location field comprises appointment information identifying at least one of a city, state, country and place describing the location.

25. The computer recording medium of claim 19, wherein the calendar entries are displayed color coded to indicate time zone differences.

26. The computer recording medium of claim 25, wherein a time zone difference represents a difference between the time zone setting on the user's computer when the appointment was input to the system and the time zone of the appointment location.

27. The computer recording medium of claim 19, wherein the appointment scheduling fields allow the user to distinguish between a single location appointment and a multiple location appointment.

* * * * *